United States Patent
McDowell et al.

(10) Patent No.: US 11,142,272 B1
(45) Date of Patent: Oct. 12, 2021

(54) CYCLE DISPLAY FIXTURE WITH CYCLE RETENTION ASSEMBLY

(71) Applicant: TARGET BRANDS, INC., Minneapolis, MN (US)

(72) Inventors: Daniel McDowell, Minneapolis, MN (US); Jeremy A. Clark, Minneapolis, MN (US); Scott E. Denby, Minneapolis, MN (US); Andrew J. Liesveld, Omaha, NE (US); Marian H. Locke, Parker, CO (US); Christopher P. Doepke, Spring Branch, TX (US); Mark A. Campbell, Middlebury, IN (US); Douglas J. Burman, Oak Grove, MN (US); Matthew D. Purrington, Cottage Grove, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 0 days.

(21) Appl. No.: 16/945,251

(22) Filed: Jul. 31, 2020

(51) Int. Cl.
  B62H 3/08 (2006.01)
(52) U.S. Cl.
  CPC ......... B62H 3/08 (2013.01); *B62H 2700/005* (2013.01)
(58) Field of Classification Search
  CPC ...... B62H 3/08; B62H 3/00; B62H 2003/005; B62H 5/14; B62H 1/06; B62H 3/10; B62H 2700/005; A47F 2003/066; A47F 10/04; A47B 53/00; A47B 45/00; B60R 9/04
  USPC ............... 211/17, 20, 175, 19, 21, 162, 151; 224/324, 310, 924, 326, 325
  See application file for complete search history.

(56) References Cited

U.S. PATENT DOCUMENTS

| | | | |
|---|---|---|---|
| 770,510 | A | 9/1904 | Stullken |
| 947,068 | A | 1/1910 | Weiske |
| 1,617,369 | A | 2/1927 | Blakely |
| 1,915,320 | A | 6/1933 | Jones |
| 2,465,551 | A | 3/1949 | Otterness |
| 2,533,981 | A | 12/1950 | Weaver |
| 2,569,858 | A | 10/1951 | Kirtner et al. |
| 3,171,632 | A | 3/1965 | Jines |
| 3,201,078 | A | 8/1965 | Grandjean |
| 3,762,569 | A | 10/1973 | Spring |

(Continued)

OTHER PUBLICATIONS

Bicycle Rack from Lozier Product Catalog and Associated Product Drawings. Feb. 16, 2007 (3 pages).

(Continued)

*Primary Examiner* — Jennifer E. Novosad
(74) *Attorney, Agent, or Firm* — JoAnn M. Seaton; Griffiths & Seaton PLLC

(57) ABSTRACT

A display fixture for holding one or more cycles includes a linear track, a stop, a wheel mount, and a coupling member. The linear track defines a channel along the linear track. The channel is open upwardly and extends from a first end to a second end of the linear track. The stop is secured to the first end of the linear track. The wheel mount is slidably received along the linear track. The wheel mount includes a cam member, slidably interacting with the linear track, and an extension member, extending as an upward bridge between opposing sides of the cam member to receive a wheel of one of the one or more cycles by extending over a portion of the wheel. The coupling member extends through the wheel mount and the linear track to selectively secure the wheel mount in of position along the linear track.

19 Claims, 8 Drawing Sheets

(56) References Cited

U.S. PATENT DOCUMENTS

| | | | |
|---|---|---|---|
| 3,861,533 A | 1/1975 | Radek | |
| 3,865,244 A | 2/1975 | Galen et al. | |
| 3,883,002 A | 5/1975 | Moore | |
| 3,912,139 A * | 10/1975 | Bowman | B60R 9/10 |
| | | | 410/3 |
| 3,923,354 A | 12/1975 | Young | |
| 3,941,496 A | 3/1976 | Eggleston | |
| 4,189,274 A * | 2/1980 | Shaffer | B60R 9/10 |
| | | | 414/462 |
| 4,190,166 A | 2/1980 | Allsop | |
| 4,191,391 A | 3/1980 | Dorlini | |
| 4,265,383 A | 5/1981 | Ferguson | |
| 4,343,419 A | 8/1982 | Mareydt | |
| 4,442,961 A * | 4/1984 | Bott | B60R 9/10 |
| | | | 211/20 |
| 4,768,692 A | 9/1988 | Schneider | |
| 4,898,283 A | 2/1990 | Kingsford | |
| 4,901,902 A | 2/1990 | Stapleton | |
| 4,911,507 A | 3/1990 | Leist | |
| 4,957,264 A | 9/1990 | Hakanen | |
| 4,984,737 A | 1/1991 | Muth et al. | |
| 5,046,652 A | 9/1991 | Shanok et al. | |
| 5,086,930 A * | 2/1992 | Saeks | B62H 3/12 |
| | | | 211/17 |
| D328,588 S | 8/1992 | Mitchell | |
| 5,143,267 A | 9/1992 | Cucheran et al. | |
| 5,205,627 A | 4/1993 | Davison et al. | |
| 5,275,319 A | 1/1994 | Ruana | |
| 5,292,009 A * | 3/1994 | Smith | B62H 3/00 |
| | | | 211/19 |
| 5,377,886 A | 1/1995 | Sickler | |
| 5,462,398 A * | 10/1995 | Hymer | B60P 3/07 |
| | | | 414/462 |
| 5,476,200 A | 12/1995 | Wong | |
| 5,497,927 A | 3/1996 | Peterson | |
| 5,520,316 A * | 5/1996 | Chen | B60R 7/02 |
| | | | 224/539 |
| 5,549,231 A * | 8/1996 | Fletcher | B60R 9/10 |
| | | | 224/536 |
| 5,553,761 A | 9/1996 | Audoire et al. | |
| 5,560,498 A * | 10/1996 | Porter | B60R 9/10 |
| | | | 211/20 |
| 5,562,215 A | 10/1996 | Blakey et al. | |
| D378,615 S | 3/1997 | Neviaser et al. | |
| 5,690,259 A * | 11/1997 | Montani | B60R 9/042 |
| | | | 224/310 |
| 5,702,007 A | 12/1997 | Fritz et al. | |
| 5,820,002 A | 10/1998 | Allen | |
| D414,455 S | 9/1999 | Perry | |
| 5,975,391 A | 11/1999 | Aftanas et al. | |
| 5,988,403 A * | 11/1999 | Robideau | A47F 7/00 |
| | | | 211/17 |
| 6,062,396 A | 5/2000 | Eason | |
| 6,158,601 A | 12/2000 | Baker et al. | |
| 6,244,483 B1 * | 6/2001 | McLemore | B60R 9/06 |
| | | | 224/521 |
| 6,290,029 B1 | 9/2001 | Gubler et al. | |
| 6,336,562 B1 * | 1/2002 | Mori | B62H 3/08 |
| | | | 211/162 |
| 6,382,480 B1 * | 5/2002 | Egly | B60R 5/00 |
| | | | 224/310 |
| 6,386,331 B2 | 5/2002 | Scheffer | |
| 6,394,283 B1 | 5/2002 | Fletcher | |
| 6,415,970 B1 | 7/2002 | Kmita et al. | |
| 6,527,154 B2 | 3/2003 | Larsen et al. | |
| 6,575,310 B2 | 6/2003 | Chamoun | |
| 6,581,785 B1 | 6/2003 | Falkenstein | |
| 6,637,840 B2 | 10/2003 | Zaleski et al. | |
| 6,669,314 B1 | 12/2003 | Nemec et al. | |
| 6,698,994 B2 * | 3/2004 | Barrett | B60P 3/07 |
| | | | 414/462 |
| 6,752,303 B2 * | 6/2004 | McLemore | B60R 9/06 |
| | | | 224/521 |
| 6,761,297 B1 * | 7/2004 | Pedrini | B60R 9/10 |
| | | | 224/324 |
| 6,840,022 B1 | 1/2005 | Manogue et al. | |
| 7,014,002 B2 | 3/2006 | Mizuta | |
| 7,168,575 B2 * | 1/2007 | Olsen, Jr. | B60P 3/073 |
| | | | 211/17 |
| 7,273,197 B1 | 9/2007 | Huggins et al. | |
| 7,441,679 B1 | 10/2008 | Harberts et al. | |
| 7,604,131 B1 * | 10/2009 | Clark | B62H 3/12 |
| | | | 211/118 |
| 7,694,830 B1 * | 4/2010 | Larson | B62H 3/08 |
| | | | 211/20 |
| 7,784,622 B2 | 8/2010 | Bernard | |
| D625,678 S | 10/2010 | Heinz | |
| 7,815,083 B2 * | 10/2010 | Clausen | B60R 9/06 |
| | | | 224/501 |
| 7,857,177 B2 | 12/2010 | Reeves et al. | |
| 8,113,398 B2 * | 2/2012 | Sautter | B60R 9/10 |
| | | | 224/497 |
| 8,496,148 B2 * | 7/2013 | Farney | B60R 9/10 |
| | | | 224/497 |
| 8,800,786 B2 | 8/2014 | Parkins | |
| 8,820,004 B1 * | 9/2014 | Jeffords | E04H 6/005 |
| | | | 52/79.4 |
| D718,456 S | 11/2014 | McNamee | |
| 9,187,046 B2 | 11/2015 | Peck | |
| 9,187,047 B2 | 11/2015 | Sautter et al. | |
| 9,845,125 B1 * | 12/2017 | Liu | A47B 61/00 |
| 10,392,064 B2 * | 8/2019 | Rossiter | B62H 3/02 |
| 10,433,659 B1 | 10/2019 | Pedersen et al. | |
| 2002/0053581 A1 | 5/2002 | Peschmann et al. | |
| 2002/0125279 A1 * | 9/2002 | Edgerly | B60R 9/048 |
| | | | 224/310 |
| 2003/0089751 A1 * | 5/2003 | Munoz | B60R 9/10 |
| | | | 224/492 |
| 2003/0132259 A1 * | 7/2003 | McLemore | B60R 9/10 |
| | | | 224/519 |
| 2003/0178458 A1 | 9/2003 | Trambley et al. | |
| 2003/0222191 A1 * | 12/2003 | Tsai | F16M 13/02 |
| | | | 248/354.1 |
| 2004/0060878 A1 * | 4/2004 | Ho | B62H 3/10 |
| | | | 211/17 |
| 2004/0124159 A1 * | 7/2004 | West | B62H 3/04 |
| | | | 211/19 |
| 2004/0256339 A1 | 12/2004 | Welsch et al. | |
| 2005/0061842 A1 * | 3/2005 | Tsai | B60R 9/06 |
| | | | 224/501 |
| 2005/0236342 A1 * | 10/2005 | Jeong | B60R 9/04 |
| | | | 211/20 |
| 2006/0124678 A1 | 6/2006 | Wooten | |
| 2006/0191858 A1 | 8/2006 | Posner | |
| 2006/0290154 A1 | 12/2006 | Stapleton | |
| 2007/0144992 A1 | 6/2007 | Chen | |
| 2007/0246496 A1 | 10/2007 | Reeves et al. | |
| 2008/0272137 A1 | 11/2008 | Fitzgerald et al. | |
| 2015/0008197 A1 * | 1/2015 | Blume | B62H 3/04 |
| | | | 211/20 |
| 2015/0102076 A1 | 4/2015 | Peck | |
| 2019/0381947 A1 | 12/2019 | Fehr | |

OTHER PUBLICATIONS

Bicycle Rack from Lozier Product Catalog, 2018 (1 page).

McDowell, Daniel. U.S. Appl. No. 16/945,245, filed Jul. 31, 2020 (33 pages).

"Park Right® Flat-Free Tire Ramps—Set of 4", printed from www.walmart.com/ip/Park-Right-Flat-Free-Tire-Ramps-Set-...xpcnL XE6k2as4Jpl3aAuAxsuSUjTUoAdKOvp065qUP3ufMZYbsaAj-IEALw_wcB, publicly available at least as early as Mar. 26, 2018 (9 pages).

* cited by examiner

CYCLE DISPLAY FIXTURE WITH CYCLE RETENTION ASSEMBLY

BACKGROUND OF THE INVENTION

Bicycles often cause issues for storage and transport due to their need to be maintained in a generally upright and balanced position to alleviate space concerns and promote the general well-being of the bicycle. Such storage needs can be further problematic in a retail or similar setting when it is desired to display bicycles in an upright position so potential consumers can view each bicycle in an "in use" position. In general, it is desirable that the means for supporting each bicycle is visually as unobtrusive as possible so as not to detract from the overall look and features of the bicycle. At the same time, the means for supporting each bicycle needs to be sufficiently secure that a bicycle is generally prevented from tipping or otherwise falling even when potential consumers touch or otherwise visually interact with the bicycles while inspecting the one or more bicycles for potential purchase.

SUMMARY

One embodiment of the present invention relates to a display fixture for holding one or more cycles includes a linear tack, a stop, a wheel mount, and a coupling member. The linear track defines a channel along a length of the linear track. The channel is open upwardly and extending from a first end to a second end of the linear track. The stop is secured to the first end of the linear track and covers a corresponding end of the channel. The mount slidably is received along the linear track from the second end of the linear track. The wheel mount includes a cam member, slidably interacting with the linear track, and an extension member, extending as an upward bridge between opposing sides of the cam member with a size and a shape configured to receive a wheel of one of the one or more cycles by extending along opposing sides of and over a portion of the wheel. The coupling member extends through the wheel mount and the linear track to selectively secure the wheel mount in one of a plurality of positions along the linear track. Other display fixtures, cycle retention assemblies, other assemblies and associated methods are also described herein.

BRIEF DESCRIPTION OF THE DRAWINGS

Embodiments of the invention will be described with respect to the figures, in which like reference numerals denote like elements, and in which.

DETAILED DESCRIPTION

Figure 1:
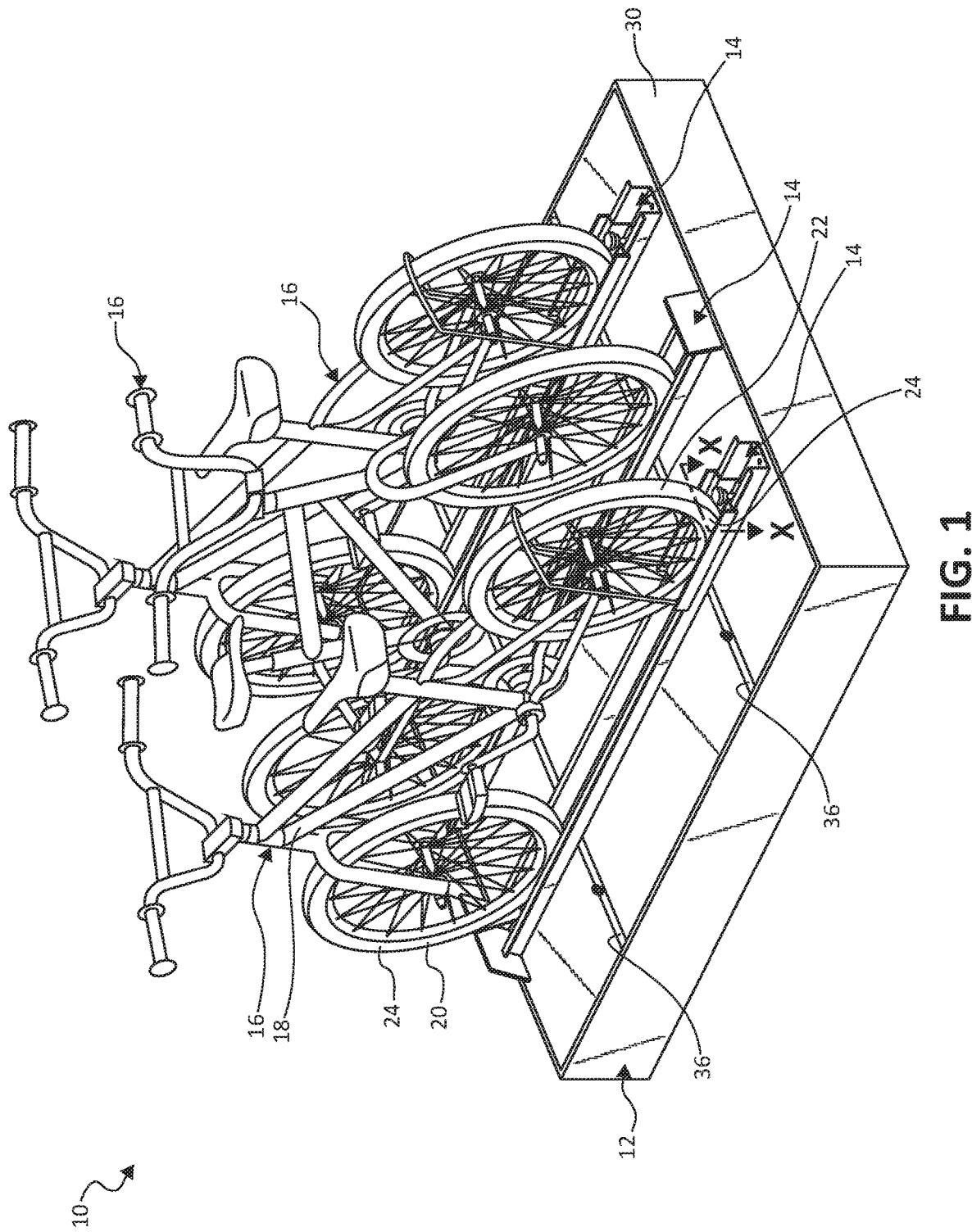
FIG. 1 is a perspective view illustration of a cycle display fixture with a plurality of cycles mounted thereon, according to one embodiment of the present invention.

The following detailed description of the invention provides example embodiments and is not intended to limit the invention or the application and uses of the invention. Furthermore, there is no intention to be bound by any theory presented in the preceding background of the invention or the following detailed description of the invention. Relational terms herein such a first, second, top, bottom, etc. may be used herein solely to distinguish one entity or action from another without necessarily requiring or implying an actual such relationship or order. In addition, as used herein, the term "about" or "substantially" apply to all numeric values or descriptive terms, respectively, and generally indicate a range of numbers or characteristics that one of skill in the art would consider equivalent to the recited values or terms, that is, having the same function or results.

This innovation provides one or more cycle retention assemblies for supporting bicycles or other cycles in a retail or other setting in a generally upright or "in-use" position. This position allows potential consumers to evaluate the overall look, other features, and presentation of such features and control therefor while the cycle retention assemblies securely maintains the cycle in place on the display. In one embodiment, the cycle retention assembly employs a linear track for receiving a cycle, the linear track having a static stop on one side and a wheel mount slidably received on the linear track opposite the static stop. The wheel mount is slidable along, while also being selectively securable in a static position along, the linear track to extend over and along either side and a top portion of one of cycle wheels, for example a rear wheel, in a manner generally preventing the bicycle from tipping side to side. Wheel mount, additionally extends over the top portion of a cycle wheel to also decrease vertical, for example, upward, movement of the cycle from the linear track. In addition, in one embodiment, the linear track forms an open channel for receiving a lower portion of each of the two wheels of the bicycle to additionally facilitate support of the bicycle in an upright position and to prevent tippling of side bicycle side to side. The static stop and the wheel mount collectively prevent rolling or other front-to-back movement of the cycle, for example, along the linear track.

In one embodiment, one or more of the cycle retention assemblies are selectively coupled to a top of a free-standing platform or box having a top surface elevated from a floor or other supporting surface that it sits upon. In one example, the platform includes two rails extending substantially parallel with one another near top surface of the platform, where each securement tack assembly is selectively coupled to each of the two rails. In one embodiment, the platform is additionally configured to selectively store unused portions of cycle retention assemblies, coupling members, related sign holders, and/or other fixture pieces during periods of non-use. In one example, the storage feature of the platform is generally visually undetectable during display of cycle display fixture including platform and cycle retention assemblies. Embodiments of the cycle display fixture are further described below. Other embodiments and variations thereof are also contemplated and will be apparent to those of skill in the art upon reading the present application.

Figure 2:
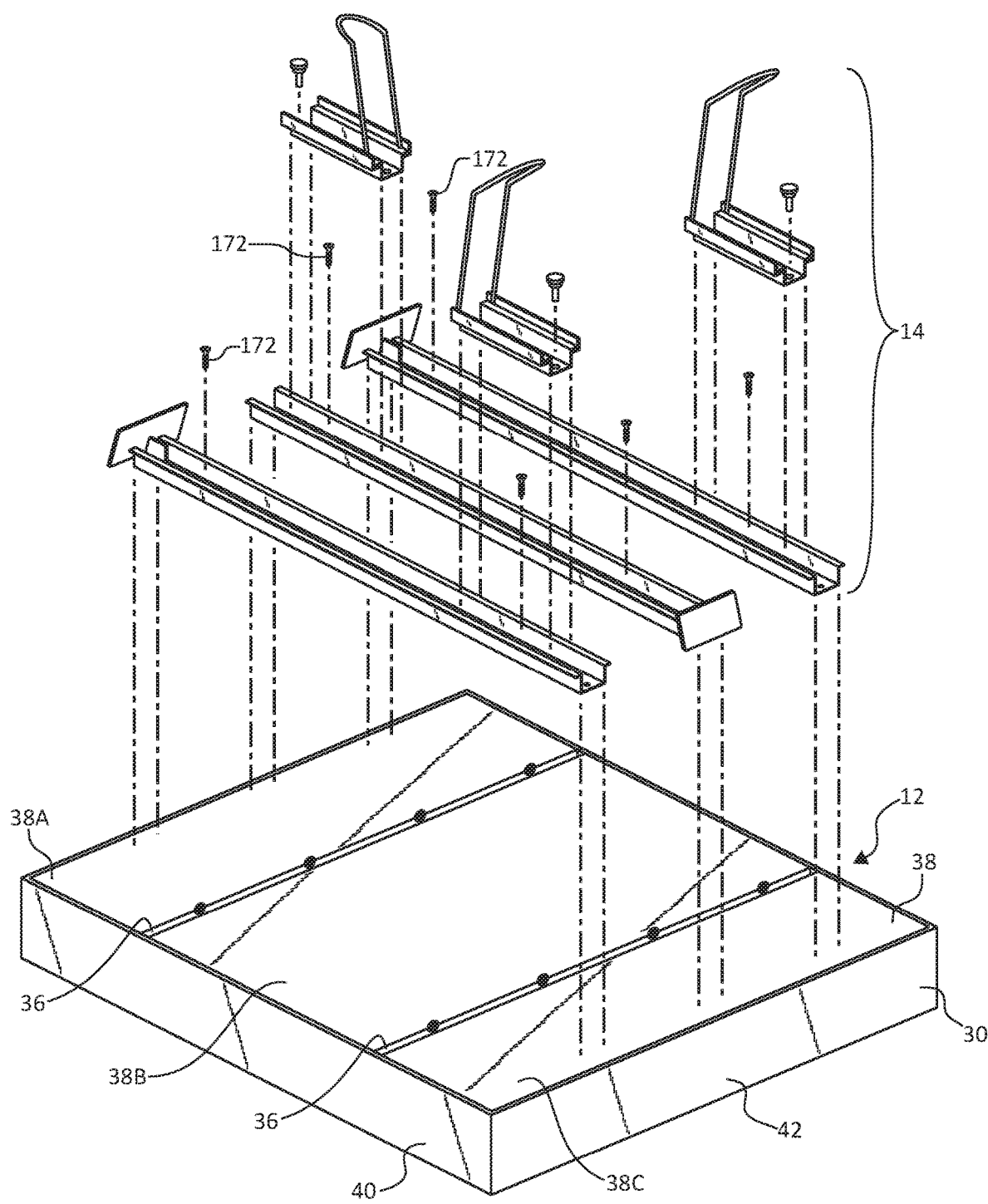
FIG. 2 is an exploded perspective view illustration of the cycle display fixture of FIG. 1, according to one embodiment of the present invention.

Turning to the Figures, FIGS. 1 and 2 illustrate a cycle display fixture 10, according to one embodiment of the present invention. Cycle display fixture 10, in one example, includes a platform 12 and one or more cycle retention assemblies 14 on a top portion thereof. In one embodiment, cycle display fixture 10 is a free-standing fixture designed to be placed on a supporting floor or other such surface. More specifically, platform 12 is positioned on the supporting floor or similar structure acting as a riser or other elevating base for cycle display fixture 10. Each of the one or more cycle retention assemblies 14 supports one or more bicycles 16, for instance, as illustrated in FIG. 1, in a retail setting offering the one or more bicycles 16 on retail display to potential consumers or for other storage or display purposes.

In one example, cycle display fixture 10 supports each of the one or more bicycles 16 in a substantially vertical position, that is to be positioned generally as each of the one or more bicycles 16 is orientated during use of such bicycle 16. In this manner, a potential consumer is able to see each of the one or more bicycles 16 in a position one would see the bicycle 16 during use. For example, where each of the one or more bicycles 16 includes a bicycle frame 18, a first wheel 20, and a second wheel 22 with each of the first and second wheels 20 and 22 having a tire 24 thereon, each of the one or more bicycles 16 is placed on tires 24 such that bicycle frame 18 generally is orientated vertically extending upwardly from tires 24.

Figure 3:
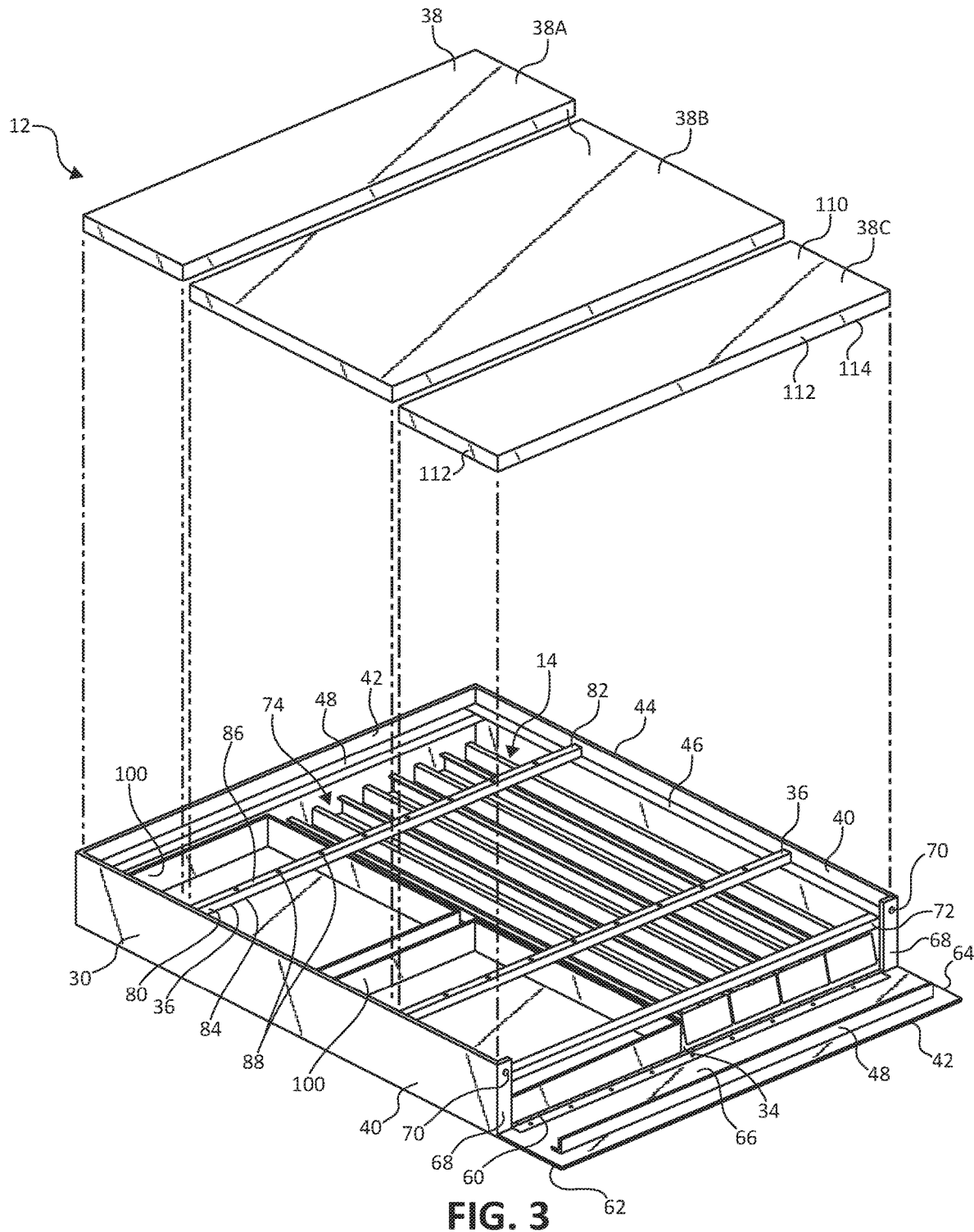
FIG. 3 is an exploded perspective view illustration of a platform of the cycle display fixture of FIG. 2, according to one embodiment of the present invention.
Figure 4:
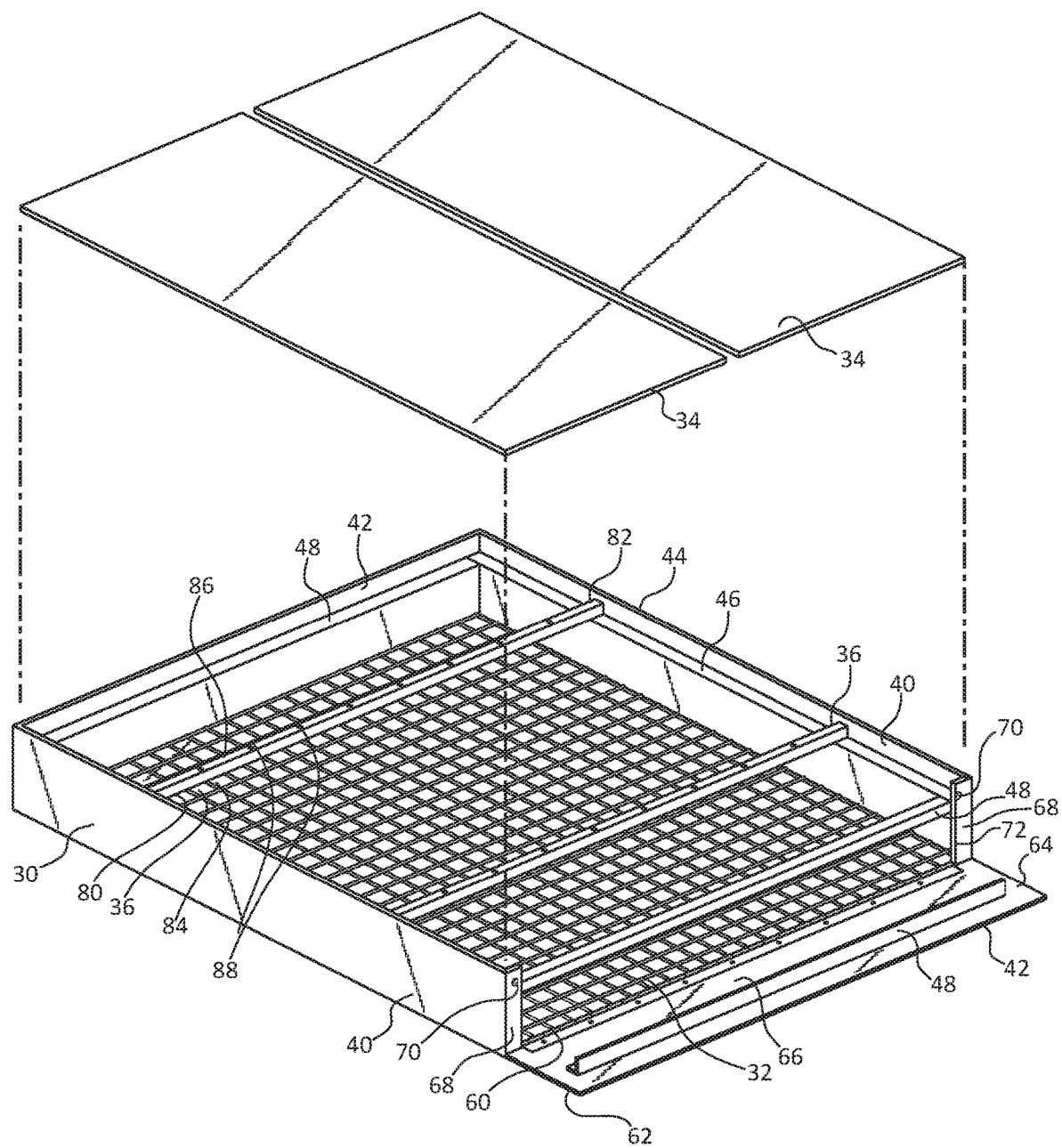
FIG. 4 is an exploded perspective view illustration of a portion of the display platform of FIG. 3, according to one embodiment of the present invention.

One example of platform 12 is illustrated in more detail in the exploded view of FIGS. 3 and 4. In one example, platform 12 includes a frame 30, bottom grid 32 (FIG. 4), bottom panels 34, top rails 36, and top deck panels 38. Frame 30 forms the structural body of platform 12, for instance, a rectangular box-like outer shape including two lateral walls 40 opposite one another and two longitudinal walls 42 opposite one another and each extending between ends of the two lateral walls 40. Lateral walls 40 and longitudinal walls 42 collectively define a perimeter top edge 44 of platform frame 30 and bottom edges 50 opposite perimeter top edges 44. In one example, a ledge 46 protrudes inwardly from an inside of each lateral wall 40 just below perimeter top edge 44. A ledge 48 is secured to and protrudes inwardly from an inside surface 66 of each longitudinal wall 42 just below a portion of perimeter top edge 44 formed by the respective longitudinal wall 42.

Bottom grid 32 covers a substantially entirety of a bottom of cavity 74 being securely coupled to each of bottom edges 50 according to one embodiment. In one example, bottom grid 32 contacts a lower supporting surface (not shown) while in other examples, adjustable or other feet or risers (not shown) raises bottom grid 32 and platform 12 as a whole just above the lower supporting surface. As illustrated, in one embodiment, one or more bottom panels 34 are each substantially planar and formed of a substantially rigid material are placed directly on or slightly above bottom grid 32 to provide a substantially solid surface as the bottom of cavity 74. In one example, bottom panels 34 are sized and shaped to collectively, substantially entirely cover bottom grid 32 in a manner preventing items maintained in cavity 74 from falling through bottom grid 32 to the lower supporting surface (not shown) below platform 12. In one embodiment, bottom panels 23 are slid into place over bottom grid 32 after frame 30 is assembled. Bottom panels 23 may simply lay on bottom grid 32 while in other embodiments, bottom panels 23 are selectively or permanently secured to frame 30 and/or bottom grid 32. In one embodiment, magnets are included on one or both of frame 30 and/or bottom grid 32 to selectively hold bottom panels 23 and hold the same in place within cavity 74.

In one example, one or both of longitudinal walls 42 are configured to hingedly fold downwardly to open the respective side of frame 30, for instance, about a hinge 60, which couples each longitudinal wall 42 to a corresponding portion of bottom edge 50. In this manner, each of longitudinal walls 42 includes a first free end 62 and an opposing second free end 64, which are not directly secured to either of lateral walls 40. In one embodiment, a coupling flange 68 extends from an end of each lateral wall 40 toward a corresponding end of the other one of lateral walls 40. A magnet 70, such as a rare earth magnet, is applied near the top of each of coupling flanges 68. Each longitudinal wall 42 is configured to interact with magnet 70, for example, by having a magnet of its own and/or being formed of a magnet material such as steel, to selectively secure each longitudinal wall 42 in the closed position as illustrated in FIG. 1. In one embodiment, a support 72 extends between the two opposing lateral walls and, in one instance, between opposing coupling flanges 68 to provide structural stability to platform 12 near perimeter top edge 44. As illustrated, ledge 48 is positioned to fit just over and/or rest on support 72 when each longitudinal wall 42 is closed.

When open longitudinal wall 42 is open, access is provided from the corresponding side of platform 12 to a cavity 74 formed inside platform 12, more specifically, formed between lateral walls 40 and longitudinal walls 42. In this manner, cavity 74 is readily usable to maintain fixture or other items during periods of nonuse. For example, as illustrated, cavity 74 is optionally used to maintained one or more cycle retention assemblies 14 or parts thereof not currently in use. In such an example, each cycle retention assembly 14 or portion thereof is able to slide into cavity 74 from one or the other of open longitudinal walls 42. In one embodiment, platform 12 is configured to store items therein in a manner substantially hidden from view when both longitudinal walls 42 are closed.

In one example, divider boxes 100 or other structures essentially functioning as drawers or other item containment structures are also sized and shaped to be slid into cavity 74 through one or both of longitudinal walls 42 when the corresponding longitudinal wall 42 is hingedly folded downward to provide access to boxes 100. Boxes 100 may be formed of any suitable and substantially rigid material, as will be apparent to those of skill in the art. In one embodiment, bottom panels 34 are substantially planar and of relatively low friction, especially in comparison to bottom grid 32, to allow boxes 100 to be relatively slid into and out of open ends, formed when one of longitudinal walls 42 is folded down. In one example, bottom panels 34 allow other items to be fairly easily slid into and out of an interior cavity of platform 12.

Top rails 36 extend between lateral walls 40 as shown in the illustrated embodiment or between and substantially parallel to longitudinal walls 42. Top rails 36 are elongated, for example, an angle or rectangular tubular member, having a first end 80, an opposite second end 82, a bottom surface 84, and a top surface 86 opposite bottom surface 84. According to one embodiment, one of first end 80 is supported by one of lateral walls 40 and/or ledge 46 thereof and second end 82 is supported by the other one of lateral walls 40 and/or ledge 46. In one example, top rails 36 are positioned such that top surface 86 thereof is place at or below a planar level with respect to perimeter top edge 44. Top surface 86, in one embodiment, includes a plurality of apertures 88, for example, a linear array of apertures 88 spaced along top rail 36 between first end 80 and second end 82. Top rails 36 are configured to selectively couple with cycle retention assemblies 14, as will be further described below.

Deck panels 38 are sized and shaped to cover cavity 74 between top rails 36. More specifically, in one embodiment, deck panels 38 includes three deck panels 38A, 38B, and 38C sized to extend between one of longitudinal walls 42 and a first one of top rails 36, between the two top rails 36, and between the second one of top rails 36 and the other one of longitudinal walls 42, respectively. Each of deck panels 38 is substantially planar and rigid to form top surface of platform 12, for example, formed of steel, aluminum, or other suitably formed metal sheet. In one example, each of deck panels 38 includes a top panel 110, which is substantially planar, and depending flanges 112 extending around and downwardly from a perimeter of top panel 110 to a bottom edge 114 thereof. Bottom edges 114 are at least partially set to rest on two or three of ledges 46 and 48 as will be apparent to those of skill in the art upon reading the present application. In one embodiment, one or more of deck panels 38 is secured to one or more of top rails 36, while in one embodiment, deck panels 38 are not directly secured to either one of top rails 36.

Figure 5:
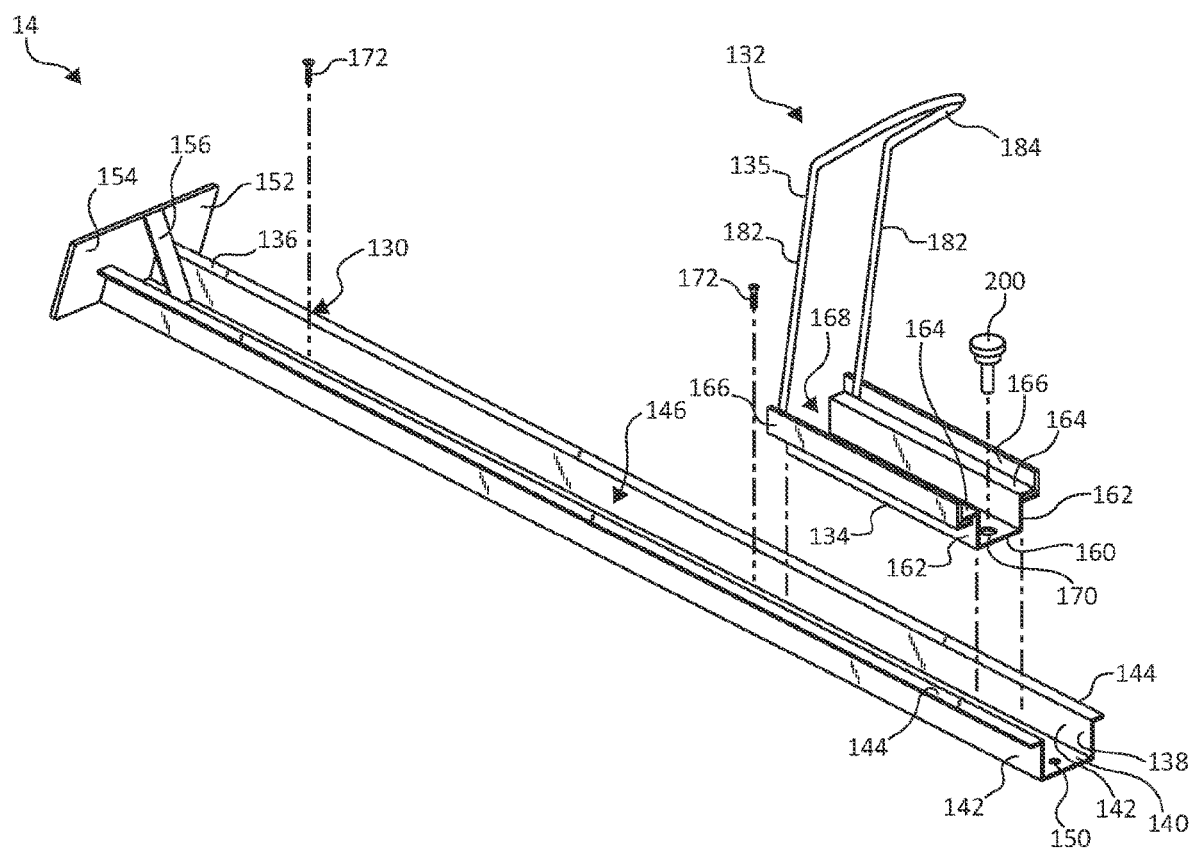
FIG. 5 is an exploded perspective view of a cycle retention assembly as included in the cycle display fixture of FIG. 2, according to one embodiment of the present invention.
Figure 6:
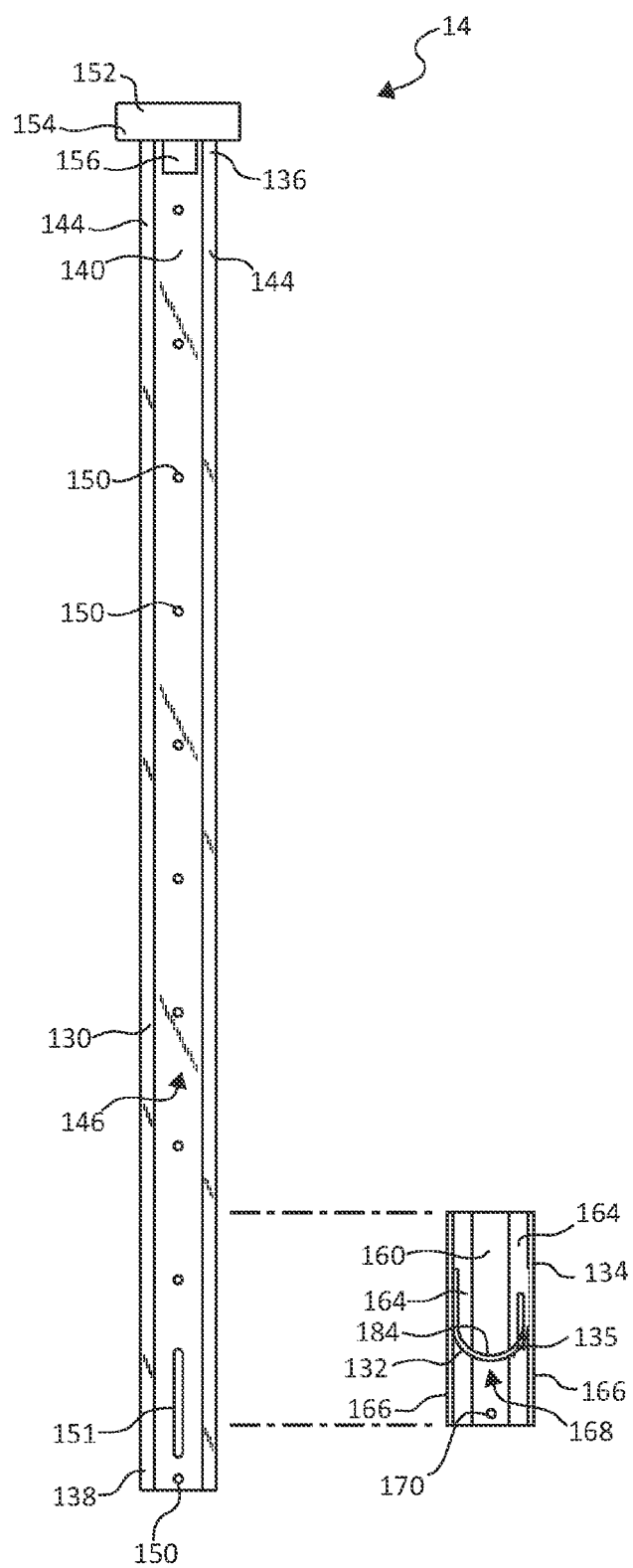
FIG. 6 is a top view illustration of the cycle retention assembly of FIG. 5, according to one embodiment of the present invention.

Each cycle retention assembly 14 is configured to receive one bicycle 16, for example, each of a first wheel 20 and a second wheel 22 and/or the tire 24 of each, to support bicycle 16 on platform 12, for example, in the manners described in additional detail below. In this manner, cycle retention assembly 14 is configured to be selectively secured to a top of platform 12, as illustrated in FIG. 1. Referring additionally to FIGS. 2, 5, and 6, each cycle retention assembly 14 includes a linear track 130 and a wheel mount 132 configured to be selectively positioned on linear track 130 in two or more positions depending on the size of bicycle 16 to be maintained by the respective cycle retention assembly 14.

Each of linear tracks 130 defines a first end 136 opposite a second end 138 and defines an elongated and open channel 146 extending substantially from first end 136 and second end 138. In one example, open channel 146 is substantially U-shaped and open along an upwardly facing side thereof. For instance, in one embodiment, as additionally shown in FIG. 7, each linear track 130 is a substantially hat channel shape formed of steel, aluminum, or other suitably rigid and durable material. Linear track 130 includes a bottom wall or web 140, opposing sidewalls or legs 142, top substantially horizontal walls or flanges 144, and an open channel 146 formed therebetween and open to a top of linear track 130. Open channel 146 is formed to have a width sized to receive most tires 24 of cycles 16 in a manner allowing tires 24 to rest on web 140 while maintained in open channel.

A linear array of apertures 150 or at least two apertures 150 are formed through web 140, for example, in a substantially even spacing. In one example, an elongated aperture or slot 151 is formed in line with apertures 150 near second end 138 and is configured to aid selective coupling with cycle retention assembly 14. In one embodiment, a back stop 152 is coupled to first end 136 of linear track 130. Back stop 152 includes a stop panel 154 and a stop support 156. Stop panel 154 is substantially planar and is coupled to an exterior of first end 136 in a manner angled from a bottom upwardly tilted toward second end 138. Stop support 156 extends from a back side of stop panel 154 angled toward second end 138 to web 140. In one embodiment, back stop, particularly, stop panel 154 covers an open end of linear track 130 otherwise providing communication to open channel 146, to generally prevent any cycle 16 maintained therein from rolling back to front and/or front to back out of open channel 146.

Figure 7:
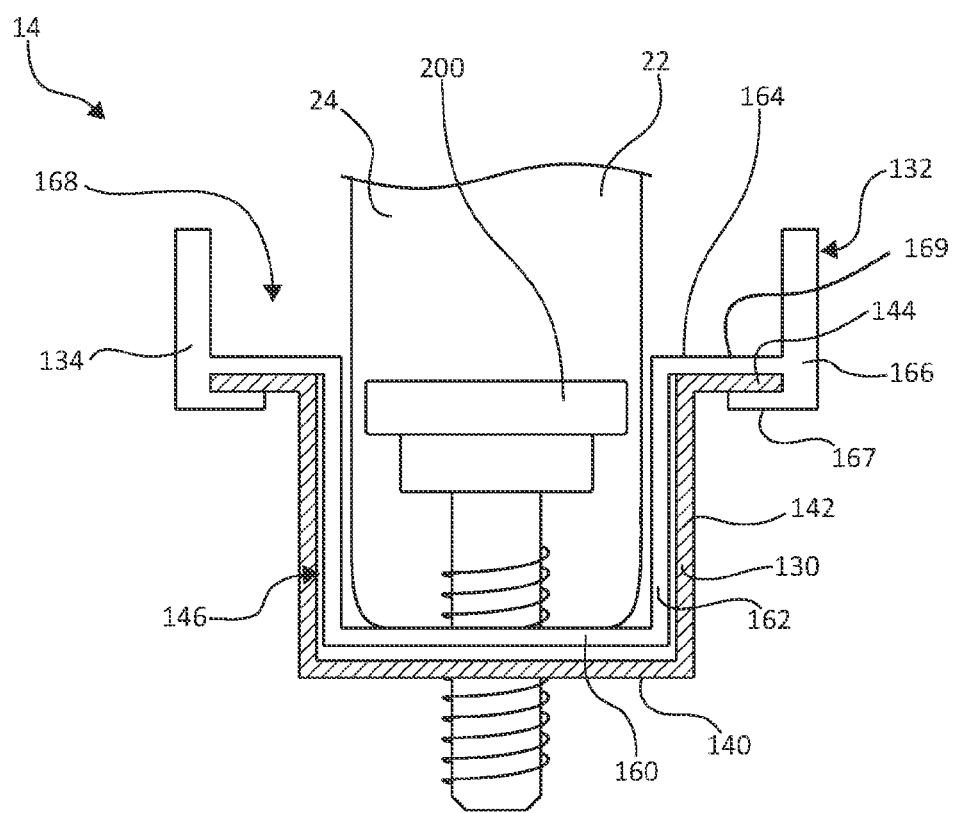
FIG. 7 is a cross-sectional view illustration taken about the line X-X in FIG. 1, according to one embodiment of the present invention.
Figure 8:
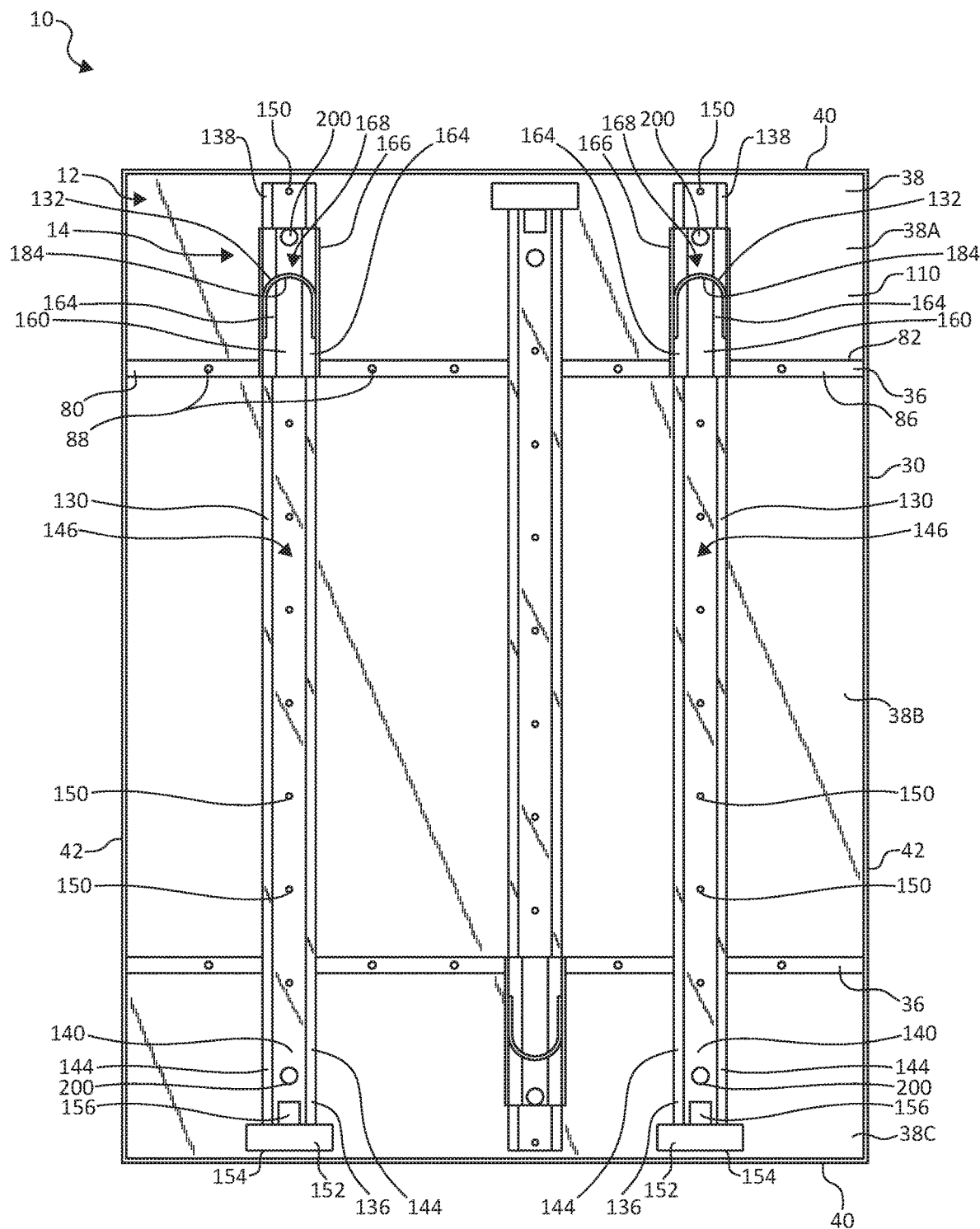
FIG. 8 is a top view illustration of the cycle display fixture of FIG. 1, according to one embodiment of the present invention.

Wheel mount 132 is configured to be slidably received by and selectively secured to linear track 130. In one embodiment, as best shown in FIGS. 5-7, wheel mount 132 includes a cam member 134 and an extension member 135 extending upwardly therefrom. Cam member 134 is a linear track, for example, a formed metal piece (e.g., steel or aluminum) of a length less than, for example, a length less than a quarter of a length of the linear track 130 as measured from a first end 157 to an opposing, second end 158 of cam member 134. In one embodiment, a portion of a cross-section of cam member 134 is shaped similarly to, but slightly smaller than, a cross-section of linear track 130. For instance, cam member 134 includes a bottom wall or mount web 160, opposing sidewalls or mount legs 162, top substantially horizontal walls or mount flanges 164 with an open cavity 168 being formed between mount web 160 and opposing mount legs 162. Open cavity 168 is formed to have a width sized to receive most tires 24 of cycles in a manner allowing tires 24 to rest on mount web 160 while maintained in open cavity 168.

In addition, in one example, cam member 134 further defines opposing walls 166, which each extends both upwardly from and slightly downwardly from a different one of mount flanges 164, extending across an end of the different one of mount flanges 164 opposite a corresponding one of mount legs 162. Each one of opposing tabs 167 of cam member 134 additionally extends inwardly from a bottom of each opposing wall 166 toward a center line of cam member 134. A thin slot 169 is defined between each flange 164 and a corresponding one of opposing tabs 167 and extending from first end 157 of cam member 134 to second end 158. One or more apertures 170 are formed in mount web 160, to facilitate selective coupling of cam member 134 to linear track 130, as will be further described below.

In one embodiment, extension member 135 is formed, for example, of a metal rod or other suitable material, to extend upwardly from opposing sides, for instance, opposing walls 166 of cam member 134. More specifically, in the illustrated embodiment, extension member 135 includes two opposing side segments 182 and a curved or U-shaped segment 184. Each side segment 182 extends substantially vertically upwardly, that is between 0° and 30° from vertical, from a different one of opposing walls 166 near first end 157 of cam member 134. U-shaped segment 184 extends from each of and couples top ends of side segments 182 to each other as an upward bridge between side segments 182. In one example, U-shaped segment 184 is curved to receive a top portion of tire 24 of second wheel 22, as illustrated in FIG. 1. U-shaped segment 184 in angled upwardly and rearwardly from side segments 182, in one embodiment, angled more rearwardly, for example, between 30° and 60° from vertical, than each side segment 182, that is with a larger angled orientation relative to vertical than side segments 182.

During installation of cycle display fixture 10 in a retail or other suitable setting, platform 12 is positioned and assembled first. For example, frame 30 is placed in location with bottom grid 32, which, as described above, is already coupled to frame 30 or at least partially positioned within and coupled to frame 30. Bottom panels 34 are slid into place on top of bottom grid 32 to fit within cavity 74 below top rails 36, which are coupled to frame 30 either before or after placement of frame 30 in its desired position. Deck panels 38 are then placed on top of frame 30 to cover cavity 74, in one embodiment, as illustrated in FIGS. 1-3. For example, each of deck panels 38A, 38B, and 38C are placed and then set on to portions of one or more of ledges 46 and 48. More specifically, bottom edge 114 of depending flanges 112 of each deck panel 38 is placed to rest on one or more of ledges 46 and 48. In one example, the height of each flange 112 is sized to allow a top surface of each deck panel 38 to fit substantially flush with top edge of lateral walls 40 and longitudinal walls 42 and/or above a top surface 86 of each of top rails 36.

Once platform 12 is assembled, in one example, cycle retention assembly 14 or parts thereof, such as linear track 130 and wheel mount 132, are placed inside cavity 74 through one of longitudinal walls 42 hingedly folded down from support 72. For instance, cavity 74 is sized to slidably receive linear tracks 130 positioned substantially perpendicularly to top rails 36. In one embodiment, boxes 100, for example, holding securement items and/or wheel mount 132, are also slide into cavity 74 through an open one of longitudinal walls 42. Other ones of linear tracks 130 are coupled to extend over deck panels 38, for example, to extend substantially perpendicularly relative to top rails 36. More specifically, as shown in FIG. 2, linear tracks 130 are positioned in a desired location on platform 12 and to be secured to each of top rails 36, that is via two or more of apertures 88. In one example, when linear tracks 130 are so positioned, linear tracks 130 extend over each of deck panels 38A, 38B, and 38C.

In one embodiment, each linear track 130 is secured to each of the two top rails 36 by threading screws, bolts, or other coupling member(s) 172 through one of apertures 150 in linear track 130 and a corresponding, that is, vertically aligned, with one of apertures 88 in each of top rails 36. While linear tracks 130 can be placed with either first end 136 or second end 138 facing either one of longitudinal walls 42. In one example, as illustrated in FIG. 1, linear tracks 130 are placed on platform 12 in alternating orientations, that so a first one of linear tracks 130 has its first end 136 facing one longitudinal wall 42 and the next or adjacent one of linear tracks 130 having its second end 138 facing that same longitudinal wall 42. In this manner, stops 152 of linear tracks 130 may alternate from end to end between adjacent linear tracks 130.

One of wheel mounts 132 is slid onto each of linear tracks 130 from second end 138 of linear track 130, such that each flange 144 of linear track 130 is slidably received in an opposing one of slots 169. Wheel mount 132 is slid to a location on the corresponding linear track 130 having a distance from stop 152 of the corresponding linear track 130 with a length of one of bicycles 16 to be displayed thereon. In one example, wheel mount 132 is slid onto linear track 130, bicycle 16 is placed in open channel 146 of linear tracks in a manner placing tire 24 of front wheel 20 against stop 152, more specifically, support 156 of stop 152.

Once bicycle 16 is so positioned, wheel mount 132 is slid toward stop 152 until a back portion of U-shaped segment 184 of extension member 135 contacts a top portion of tire 24 of rear wheel 22. Once wheel mount 132 is properly positioned, a bolt, screw, or other coupling member 200 is screwed through aperture 170 of cam member 134 and a corresponding one of apertures 150 through linear tracks 130 or, in one embodiment, elongated slot 151 through web 140. In one example, each cam member 134 is of sufficient length to space second end 158 of cam member 134 forwardly from rear wheel 22 such that coupling member 200 is fairly easily inserted through cam members 134 in a manner substantially unobstructed by rear wheel 22. Elongated slot 151 provides for more options for the refinement of the location of cam member 134 along linear track 130 than would otherwise be provided by the spacing of apertures 150. Other ones of bicycles 16 are each positioned on a different one of cycle retention assemblies 14 coupled to and located on top of platform 12.

As a result, the present invention including at least those embodiments described above provides a storage or display for one more cycles, e.g., one or more bicycles, holding the cycles upright and generally parallel to each other. The cycle display fixture is specifically configured be adjustable to maintain bicycles of various lengths and to support each of the bicycles in a manner that is substantially visually unobtrusive to the overall look and feel and features of each of the bicycles. In one example, the cycle display fixture includes an elevated platform maintaining the bicycles above floor level placing each of the bicycles in a position more easily inspected by potential consumers. In one embodiment, the display fixture is even further functionable to act as hidden storage for fixture pieces, accessories, sign holders, etc. that are not currently in use for bicycle display.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. A display fixture for holding one or more cycles, the display fixture comprising:
   a linear track defining a channel along a length of the linear track, the channel being open upwardly and extending from a first end to a second end of the linear track;
   a stop secured to the first end of the linear track and covering a corresponding end of the channel;
   a wheel mount initially slidably received along the linear track from the second end of the linear track, wherein the wheel mount includes a cam member, initially slidably interacting with the linear track to move the wheel mount to a desired one of a plurality of positions along the linear track between the first end and the second end of the linear track, and an extension member, extending as an upward bridge between opposing sides of the cam member with a size and a shape configured to receive a wheel of one of the one or more cycles by extending along opposing sides of and over a portion of the wheel; and
   a coupling member extending through the wheel mount and the linear track to selectively secure the wheel mount in the desired one of a plurality of positions along the linear track;
   wherein:
      the linear track includes a web and two opposing legs each extending upwardly from an opposite longitudinal edge of the web,
      the wheel mount includes a mount web and two opposing mount legs each extending upwardly from opposing sides of the mount web,
      the open cavity is formed between the mount web and the mount legs, and the mount web and the two opposing mount legs are shaped substantially identically to the web and two opposing legs of the linear track and are sized to fit within the open channel of the linear track such that the open cavity is maintained within the open channel.

2. The display fixture of claim 1, wherein:
the extension member is coupled to a front end of the wheel mount and is angled rearwardly toward a rear end of the wheel mount,
the front end being opposite the rear end.

3. The display fixture of claim 2, wherein:
the extension member includes a pair of side segments and a U-shaped segment, each of the pair of side segments extending upwardly from opposing sides of the cam member at a first angled orientation relative to vertical, and the U-shaped member extending upwardly and rearwardly between tops of the pair of side segments at a second angled orientation relative to vertical.

4. The display fixture of claim 3, wherein the second angled orientation is offset from vertical a larger angle than first angled orientation is offset from vertical.

5. The display fixture of claim 2, wherein the extension member is formed from a metal rod material.

6. The display fixture of claim 1, wherein:
the wheel mount includes:
opposing mount flanges each extending outwardly from a top of a different one of the two opposing mount legs, over the legs of the linear track, and
a pair of slots is formed by the wheel mount below a different one of the opposing mount flanges.

7. The display fixture of claim 6, wherein each of the pair of slots is immediately adjacent to the one of the opposing mount flanges that each of the pair of slots is formed below.

8. The display fixture of claim 1, wherein the stop extends above a top of the linear track.

9. The display fixture of claim 1, wherein the stop is angled toward the second end as it extends from a bottom of the stop to a top of the stop.

10. The display fixture of claim 1, wherein:
the stop includes a stop panel and a stop support,
the stop panel extends across the first end of the linear track, and
the stop support is angled downwardly and toward the second end of the linear track.

11. The display fixture of claim 1, wherein:
the linear track include a bottom web,
the bottom web defining an elongated slot, and
the coupling member extends through the wheel mount and the elongated slot.

12. The display fixture of claim 1, wherein the display fixture further includes a platform for selectively supporting the linear track above a supporting floor level.

13. The display fixture of claim 12, wherein:
the platform includes:
side walls forming a cavity therein;
a pair of top rails extending between two of the side walls; and
the linear track being selectively secured to the platform via coupling with each of the pair of top rails.

14. The display fixture of claim 12, wherein the linear track extends substantially perpendicularly relative to the top rails.

15. The display fixture of claim 1, in combination with the one or more cycle.

16. The display fixture of claim 1, in combination with the one or more cycle, wherein:
the wheel is a rear wheel of the cycle the cycle additionally includes a front wheel;
the front wheel and the rear wheel are each set at least partially within the open channel of the linear track;
the front wheel contacts the stop; and
the wheel mount extends over a top of a portion of the rear wheel.

17. A display fixture for holding one or more cycles, the display fixture comprising:
a linear track defining a channel along a length of the linear track, the channel being open upwardly and extending from a first end to a second end of the linear track;
a stop secured to the first end of the linear track and covering a corresponding end of the channel;
a wheel mount initially slidably received along the linear track from the second end of the linear track, wherein the wheel mount includes:
a cam member, initially slidably interacting with the linear track to move the wheel mount to a desired one of a plurality of positions along the linear track between the first end and the second end of the linear track, and
an extension member, extending as an upward bridge between opposing sides of the cam member with a size and a shape configured to receive a wheel of one of the one or more cycles by extending along opposing sides of and over a portion of the wheel; and
a coupling member extending through the wheel mount and the linear track to selectively secure the wheel mount in the desired one of a plurality of positions along the linear track;
wherein:
the linear track includes:
a bottom web,
two opposing legs each extending upwardly from an opposite longitudinal edge of the bottom web, and
two opposing flanges each extending outwardly from one of the two opposing legs away from the other of the two opposing legs; and
the wheel mount defines an open cavity and a pair of slots, wherein each of the pair of slots is positioned outside of and faces away from the open cavity below a different one of the two opposing flanges,
each of the pair of slots receives a different one of the two opposing flanges such that the open cavity is formed substantially within the open channel of the linear track.

18. The display fixture of claim 17, wherein each of the pair of slots is void of direct communication with the open cavity.

19. A display fixture for holding one or more cycles, the display fixture comprising:
a linear track defining a channel along a length of the linear track, the channel being open upwardly and extending from a first end to a second end of the linear track;
a stop secured to the first end of the linear track and covering a corresponding end of the channel;
a wheel mount initially slidably received along the linear track from the second end of the linear track, wherein the wheel mount includes:
a cam member, initially slidably interacting with the linear track to move the wheel mount to a desired one of a plurality of positions along the linear track between the first end and the second end of the linear track, and an extension member, extending as an upward bridge between opposing sides of the cam member with a size and a shape configured to receive a wheel of one of the one or more cycles by extending along opposing sides of and over a portion of the wheel; and a coupling member extending through the wheel mount and the linear track to selectively secure the wheel mount in the desired one of a plurality of positions along the linear track;

wherein:

the display fixture further includes a platform for selectively supporting the linear track above a supporting floor level;

at least one of the sidewalls is hingedly coupled to a remainder of the platform such that the at least one of the sidewalls is configured to be rotated downwardly to provide access to the platform cavity, and the at least one of the sidewalls is selectively held in a closed position via magnetic coupling with the remainder of the platform.

\* \* \* \* \*